(12) United States Patent
Pai

(10) Patent No.: US 11,713,793 B2
(45) Date of Patent: Aug. 1, 2023

(54) BICYCLE SHOCK ABSORBING DEVICE

(71) Applicant: Yao Chang Pai, Taichung (TW)

(72) Inventor: Yao Chang Pai, Taichung (TW)

(73) Assignee: DNM INDUSTRY CO., LTD., Taichung (TW)

( * ) Notice: Subject to any disclaimer, the term of this patent is extended or adjusted under 35 U.S.C. 154(b) by 104 days.

(21) Appl. No.: 17/500,926

(22) Filed: Oct. 13, 2021

(65) Prior Publication Data

US 2023/0114042 A1   Apr. 13, 2023

(51) Int. Cl.
F16F 9/44 (2006.01)
F16F 9/46 (2006.01)
B62K 25/02 (2006.01)

(52) U.S. Cl.
CPC ............... *F16F 9/44* (2013.01); *B62K 25/02* (2013.01); *F16F 9/461* (2013.01)

(58) Field of Classification Search
CPC .. F16F 9/44; F16F 9/461; F16F 9/0245; F16F 9/0263; F16F 9/48; F16F 9/56; F16F 2230/0005; B62K 25/02; B62K 25/2508; B62K 2025/048; B62K 25/04; Y10T 4/20636
USPC ........................................................ 188/285
See application file for complete search history.

(56) References Cited

U.S. PATENT DOCUMENTS

| | | | | |
|---|---|---|---|---|
| 3,059,268 A * | 10/1962 | McHale | ................... | E05F 3/102 29/445 |
| 4,076,225 A * | 2/1978 | Houghton | ................. | F16F 9/48 267/116 |
| 4,153,145 A * | 5/1979 | Ellis | ........................ | F16F 9/42 188/274 |
| 4,174,098 A * | 11/1979 | Baker | ....................... | F16F 9/44 267/221 |
| 5,597,054 A * | 1/1997 | Nagai | ..................... | F16F 9/461 188/315 |
| 5,634,653 A * | 6/1997 | Browning | .............. | B62K 21/20 267/64.15 |
| 6,334,517 B1 * | 1/2002 | De Frenne | ................ | F16F 9/44 188/314 |
| 6,360,857 B1 * | 3/2002 | Fox | ....................... | F16F 9/3485 188/319.1 |
| 7,147,207 B2 * | 12/2006 | Jordan | .................... | F16F 9/461 267/64.18 |
| 7,641,028 B2 * | 1/2010 | Fox | ...................... | F16F 9/0236 188/278 |
| 9,333,829 B2 * | 5/2016 | King | ....................... | F16F 9/185 |

(Continued)

*Primary Examiner* — Robert A. Siconolfi
*Assistant Examiner* — James K Hsiao

(57) ABSTRACT

A shock absorbing device includes a control unit and a transmission unit. The control unit includes a first shaft and a second shaft which freely and rotatably extends through the first shaft. The first end of first shaft and the first end of the second shaft protrude beyond the shock absorbing device. The transmission unit includes a first bevel gear and a second bevel gear. The second shaft freely and rotatably extends through the first bevel gear. When the first shaft is rotated to drives the first bevel gear, the first bevel gear drives the second bevel gear to adjust the recovery damping of the shock absorbing device. When the second shaft is rotated, the compression damping of the shock absorbing device is adjusted. The cooperation of the first and second bevel gears makes the operation of the shock absorbing device be smooth and stable.

6 Claims, 20 Drawing Sheets

(56) References Cited

U.S. PATENT DOCUMENTS

| | | | |
|---|---|---|---|
| 10,161,172 B2* | 12/2018 | Wörner | E05F 3/18 |
| 10,578,179 B2* | 3/2020 | Laird | B60G 17/0432 |
| 2003/0234144 A1* | 12/2003 | Fox | F16F 9/0236 |
| | | | 188/278 |
| 2005/0103149 A1* | 5/2005 | Hunt | B62K 25/00 |
| | | | 74/502.2 |
| 2005/0269178 A1* | 12/2005 | Huang | F16F 9/461 |
| | | | 188/300 |
| 2006/0131118 A1* | 6/2006 | Huang | F16F 9/461 |
| | | | 188/313 |
| 2007/0034463 A1* | 2/2007 | Huang | B62K 25/08 |
| | | | 188/300 |
| 2009/0255768 A1* | 10/2009 | Inoue | F16F 9/56 |
| | | | 188/313 |
| 2009/0267316 A1* | 10/2009 | Gonzalez | F16F 9/3242 |
| | | | 280/275 |
| 2010/0044975 A1* | 2/2010 | Yablon | F16F 9/065 |
| | | | 188/282.8 |
| 2011/0012317 A1* | 1/2011 | Mouri | F16F 9/56 |
| | | | 280/5.519 |
| 2011/0174582 A1* | 7/2011 | Wootten | F16F 9/461 |
| | | | 188/266 |
| 2012/0103119 A1* | 5/2012 | Lin | F16F 9/461 |
| | | | 74/417 |
| 2012/0247893 A1* | 10/2012 | Gonzalez | F16F 9/3242 |
| | | | 188/297 |
| 2013/0118847 A1* | 5/2013 | Krahenbuhl | F16F 9/48 |
| | | | 188/313 |
| 2015/0034436 A1* | 2/2015 | McAndrews | F16F 9/0209 |
| | | | 188/297 |
| 2015/0183487 A1* | 7/2015 | Tsai | B62K 25/28 |
| | | | 267/64.22 |
| 2018/0313423 A1* | 11/2018 | Laird | B62K 25/04 |
| 2019/0092421 A1* | 3/2019 | Nichols | F16F 9/463 |
| 2021/0033164 A1* | 2/2021 | Barefoot | F16F 9/0245 |

* cited by examiner

BICYCLE SHOCK ABSORBING DEVICE

BACKGROUND OF THE INVENTION

1. Fields of the Invention

The present invention relates to a bicycle shock absorbing device, and more particularly, to an adjustable shock absorbing device of bicycles.

2. Descriptions of Related Art

The conventional bicycle shock absorbing device is used to absorb vibration and shaking when riding on uneven roads to increase comfort to the riders.

The existed bicycle shock absorbing devices known to application are disclosed in Taiwanese Utility Models M466854, M417317, M408534, and Taiwanese Patent No. I636911 and I436920 bicycle. It is noted that when encountering a flat road or an uphill road, the pedaling force will activate the operation of the shock absorbing device, which cannot effectively transmit to the bicycle and therefore increase the physical strength required. On the contrary, when the road and uphill road are finished, the shock absorbing; device must be turned on again. Therefore, the shock absorbing device needs to be adjusted to properly increase the efficiency of pedaling.

The present invention intends to provide an adjustable shock absorbing device to eliminate shortcomings mentioned above.

SUMMARY OF THE INVENTION

The present invention relates to shock absorbing device and comprises a control unit and a transmission unit. The control unit includes a first shaft and a second shaft which freely and rotatably extends through the first shalt. The first end of first shaft and the first end of the second shaft protrude beyond the shock absorbing device. The transmission unit includes a first bevel gear and a second bevel gear. The second shaft freely and rotatably extends through the first bevel gear. When the first shaft is rotated to drives the first bevel gear, the first bevel gear drives the second bevel gear to adjust the recovery damping of the shock absorbing device. When the second shaft is rotated, the compression damping of the shock absorbing device is adjusted. The cooperation of the first and second bevel gears makes the operation of the shock absorbing device be smooth and stable.

The primary object of the present invention is to provide an adjustable shock absorbing device that is able to adjust the recovery damping status and the compression damping status. The adjustment is operated on one side of the shock absorbing device. The cooperation of the first and second bevel gears makes the operation of the shock absorbing device be smooth and stable.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
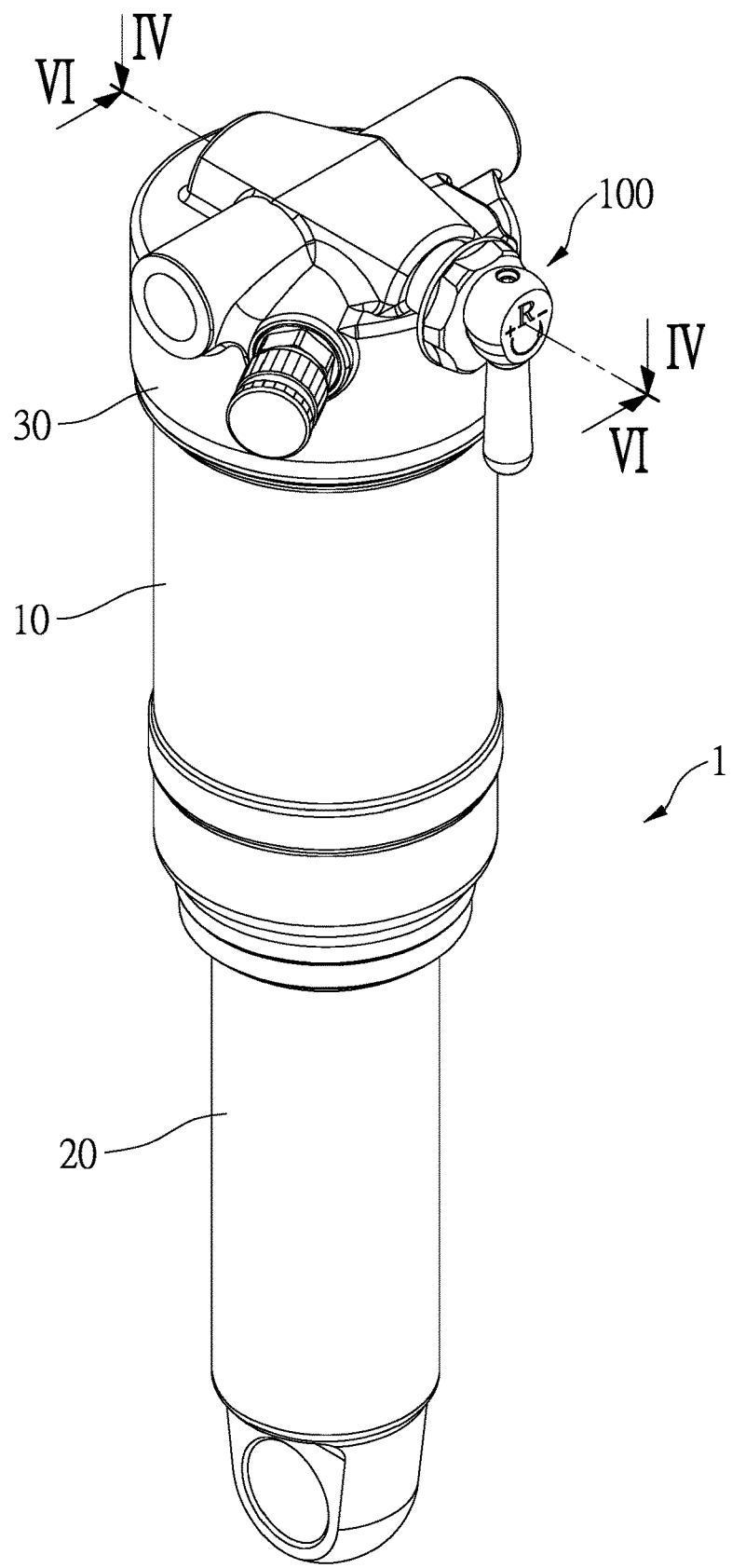
FIG. 1 is a perspective view to show the shock absorbing device of the present invention.
Figure 2:
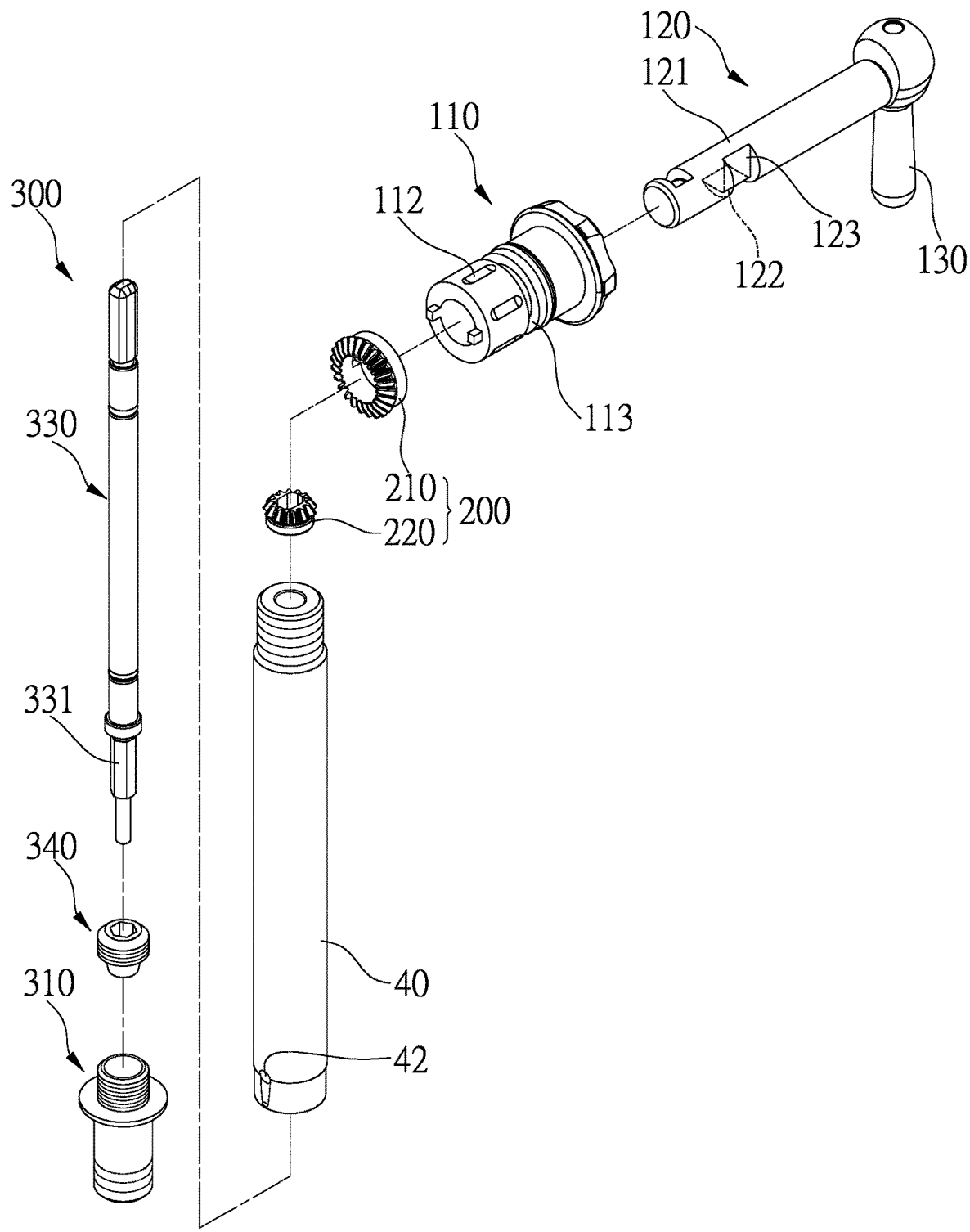
FIG. 2 is an exploded view of the shock absorbing device of the present invention.
Figure 3:
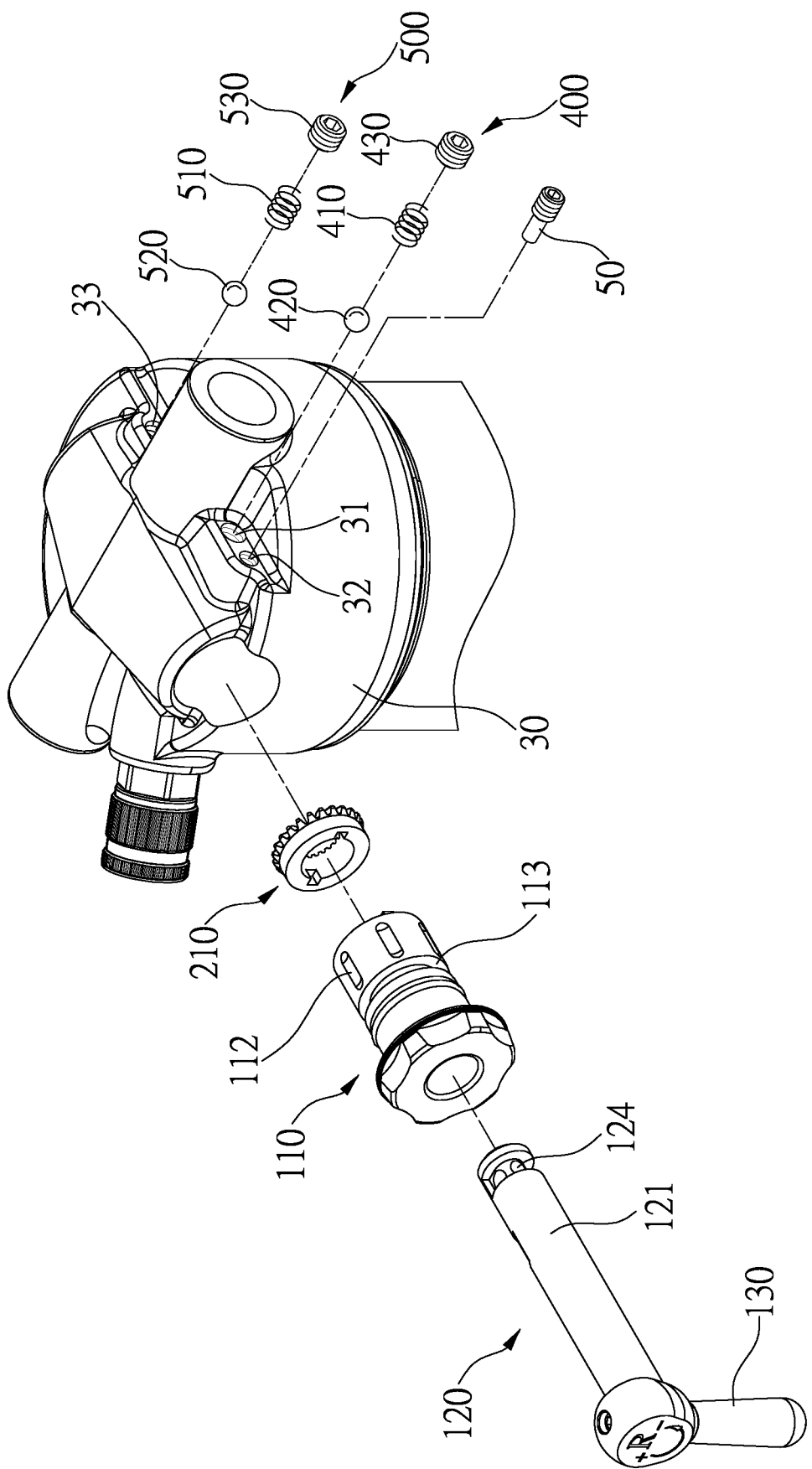
FIG. 3 is another exploded view of the shock absorbing device of the present invention.

Referring to FIGS. 1 to 3, the shock absorbing device 1 of the present invention comprises a control unit 100 and a transmission unit 200. The control unit 100 includes a first shaft 110 and a second shaft 120. The second shaft 120 freely and rotatably extends through the first shaft 110. The first end of first shaft 110 and the first end of the second shaft 120 protrude beyond the shock absorbing device 1. The transmission unit 200 includes a first bevel gear 210 and a second bevel gear 220, wherein the second shall 120 freely and rotatably extends through the first bevel gear 210. When the first shaft 110 is rotated to drives the first bevel gear 210, the first bevel gear 210 drives the second bevel gear 220 to adjust the recovery damping of the shock absorbing device 1. When the second shaft 120 is rotated, the compression damping of the shock absorbing device 1 is adjusted.

By the second shaft 120 freely and rotatably extending through the first shaft 110, and the second shaft 120 freely and rotatably extending through the first bevel gear 210, when the recovery damping, the first shaft 110 is rotated to drive the first bevel gear 210, and the first bevel gear 210 is engaged with the second bevel gear 220 and drives the second bevel gear 220, then the second bevel gear 220 is able to adjust the recovery damping. When the compression damping is adjusted, the second shaft 120 is rotated to drive the first bevel gear 210 to complete the adjustment. The first and second shafts 120, 110 are co-axially combined and located at one side of the shock absorbing device 1, so that the users can operated the recovery damping and the compression damping conveniently. Not like the conventional shock absorbing devices with multiple protrusion in different directions, the users may hit the protrusion during pedaling.

Figure 5:
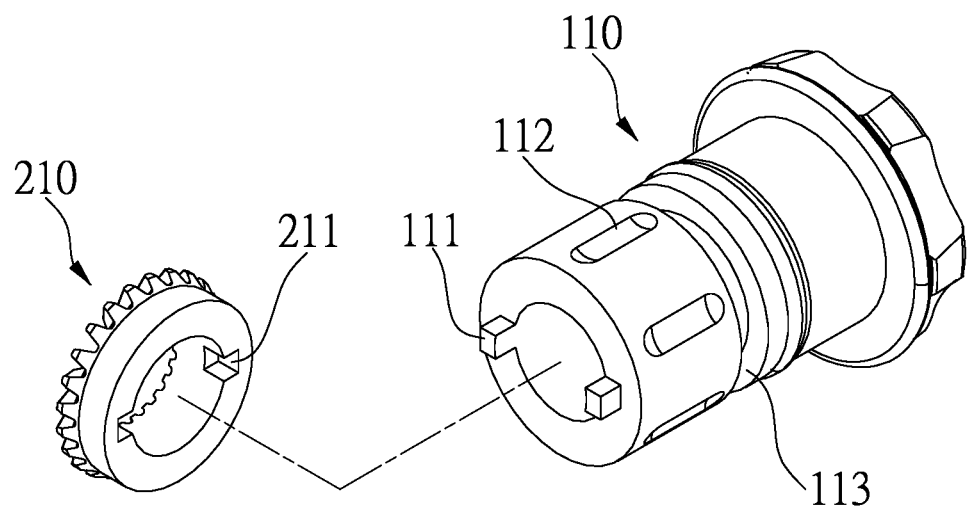
FIG. 5 shows the first bevel gear and the first shaft of the shock absorbing device of the present invention.
Figure 6:
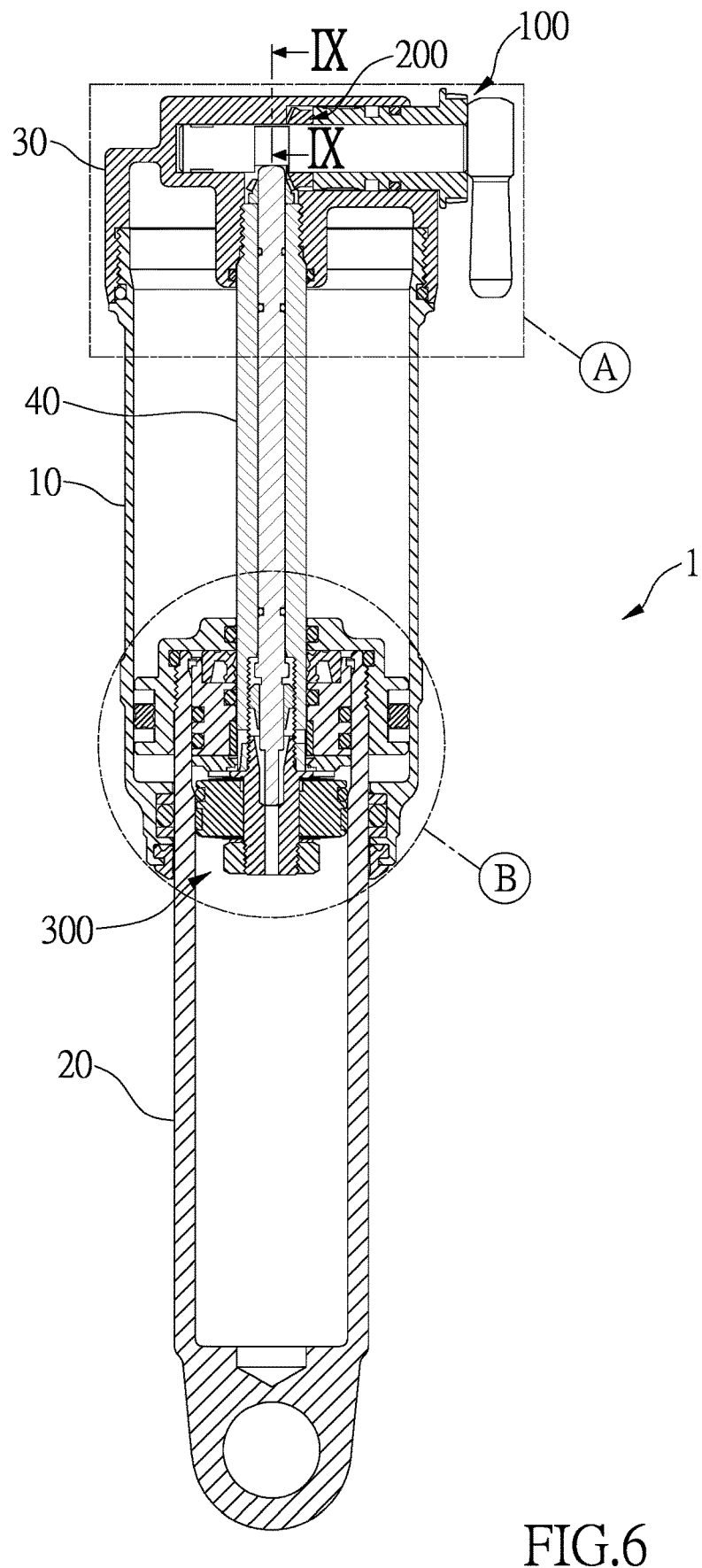
FIG. 6 is a cross sectional view, taken along line VI-VI in FIG. 1.
Figure 7:
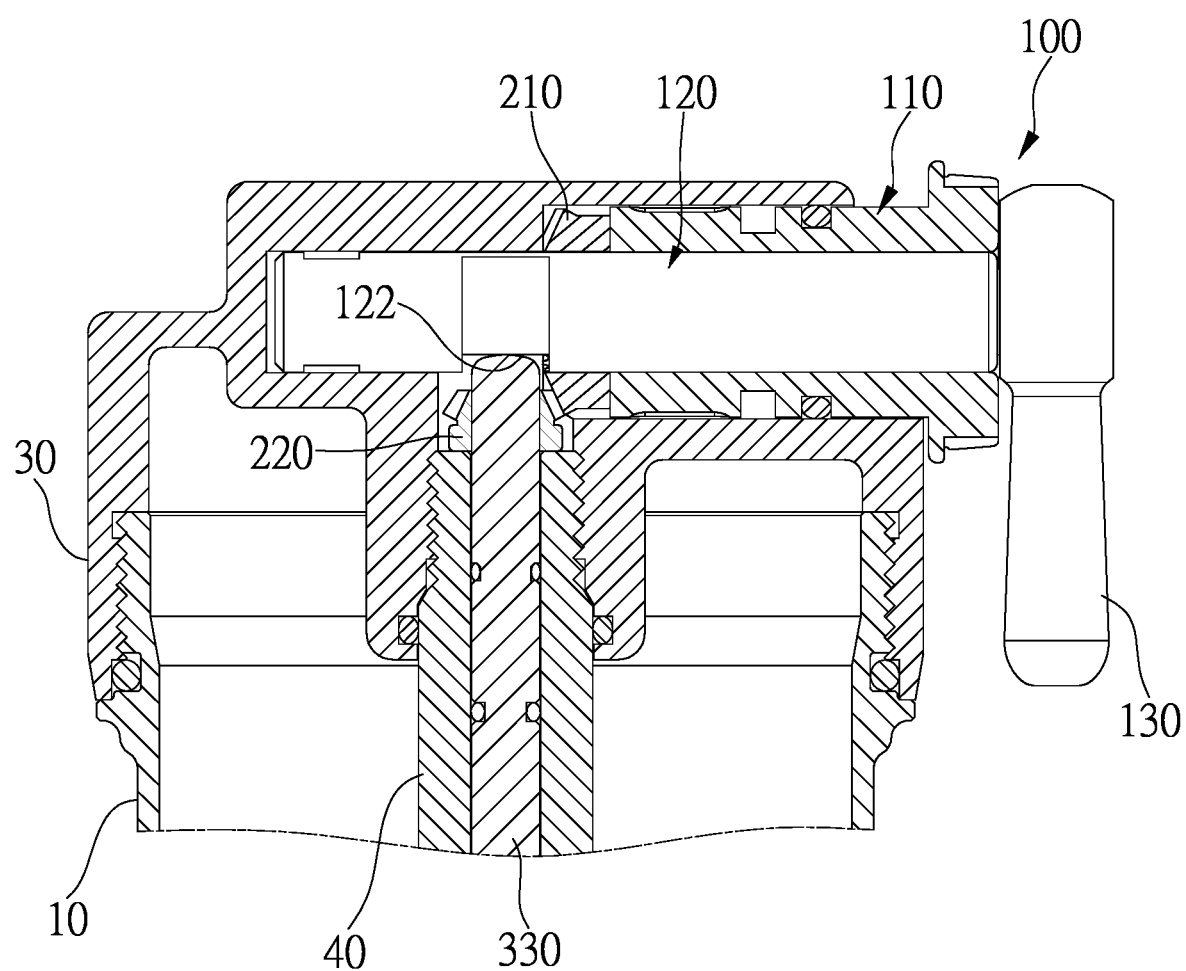
FIG. 7 is an enlarged view of the "A" portion in FIG. 6.
Figure 8:
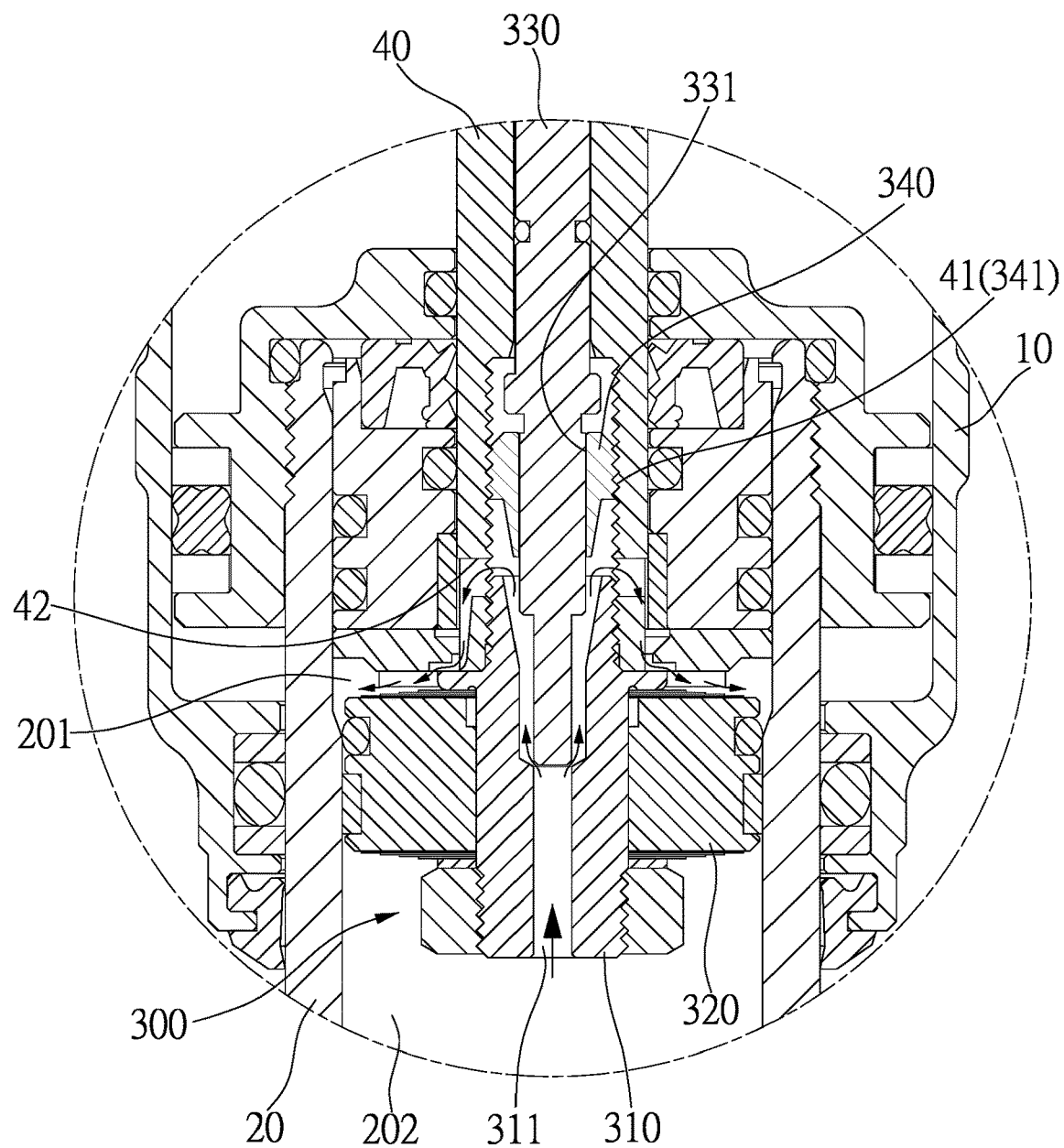
FIG. 8 is an enlarged view of the "B" portion in FIG. 6.
Figure 9:
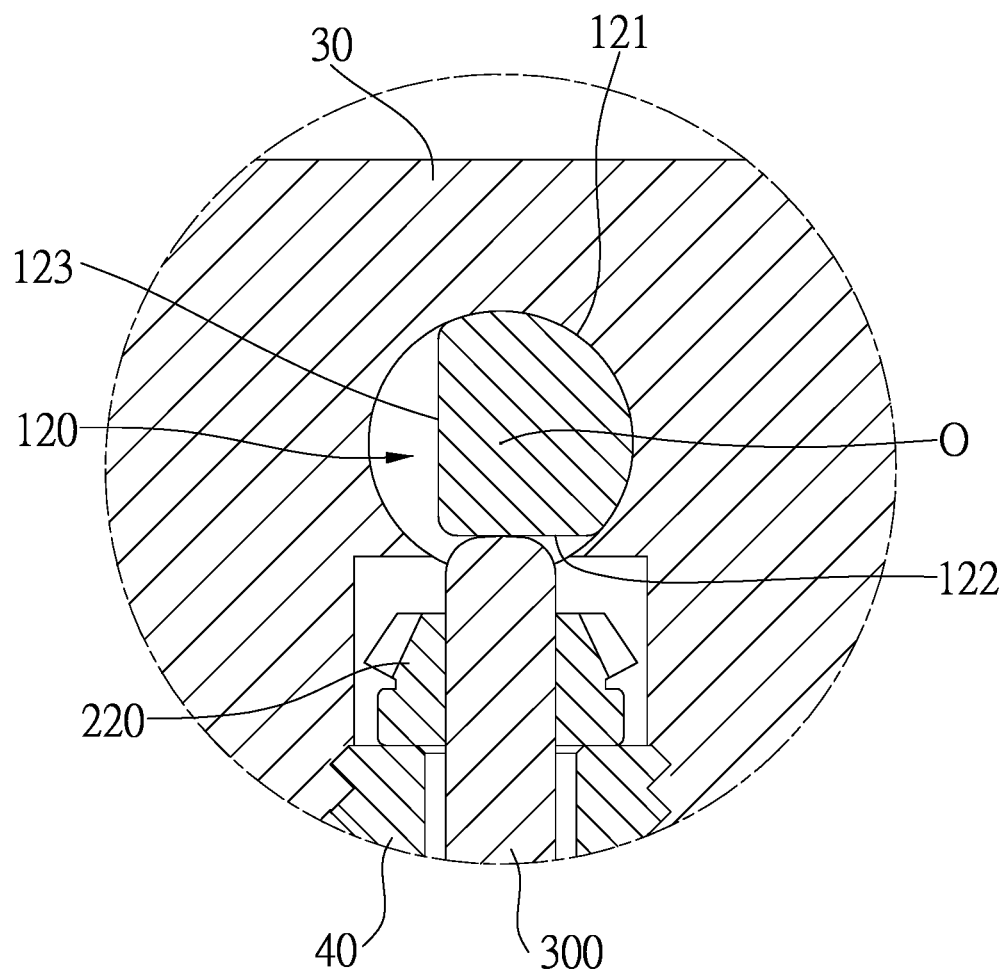
FIG. 9 is a cross sectional view, taken along line IX-IX in FIG. 6.
Figure 10:
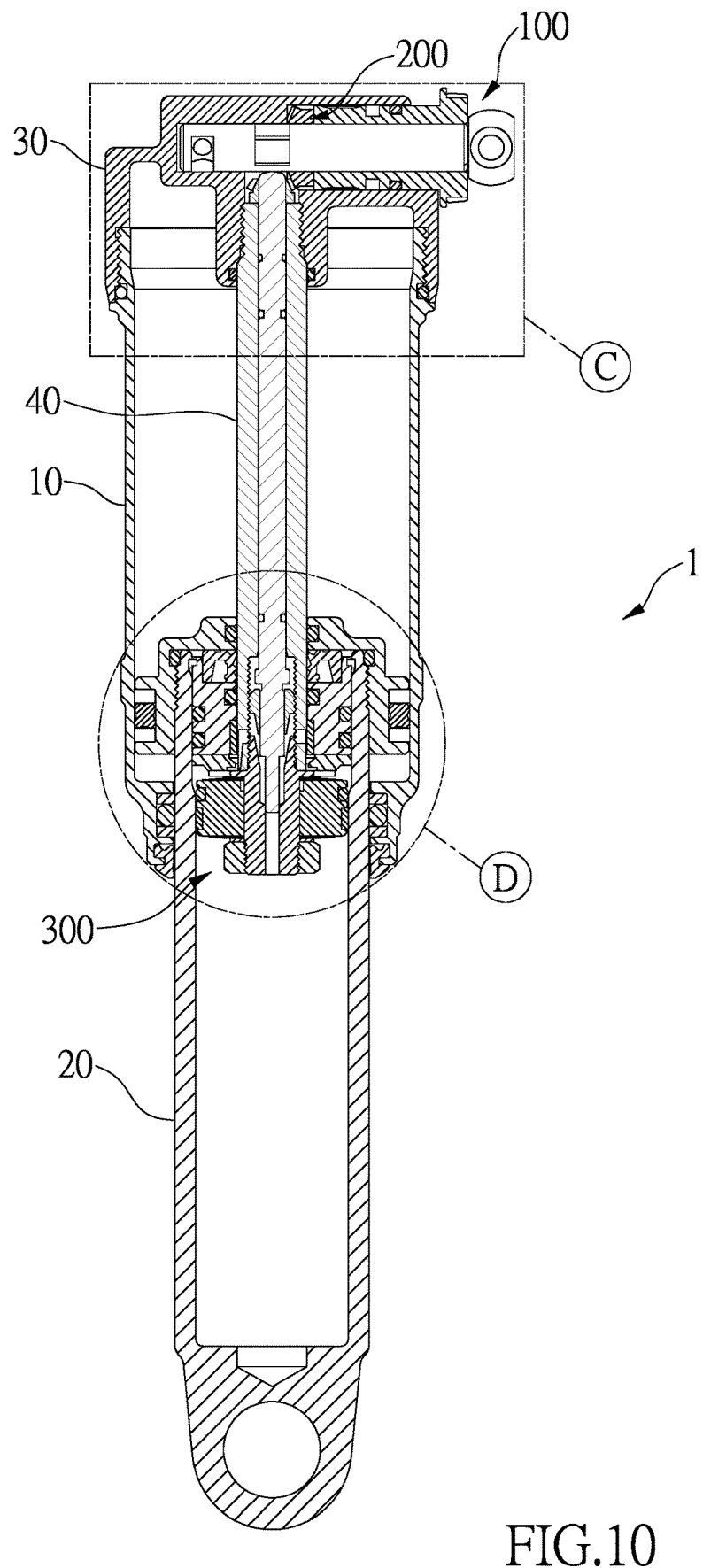
FIG. 10 is a cross sectional view to show the adjustment of the compression damping of the shock absorbing device of the present invention.
Figure 11:
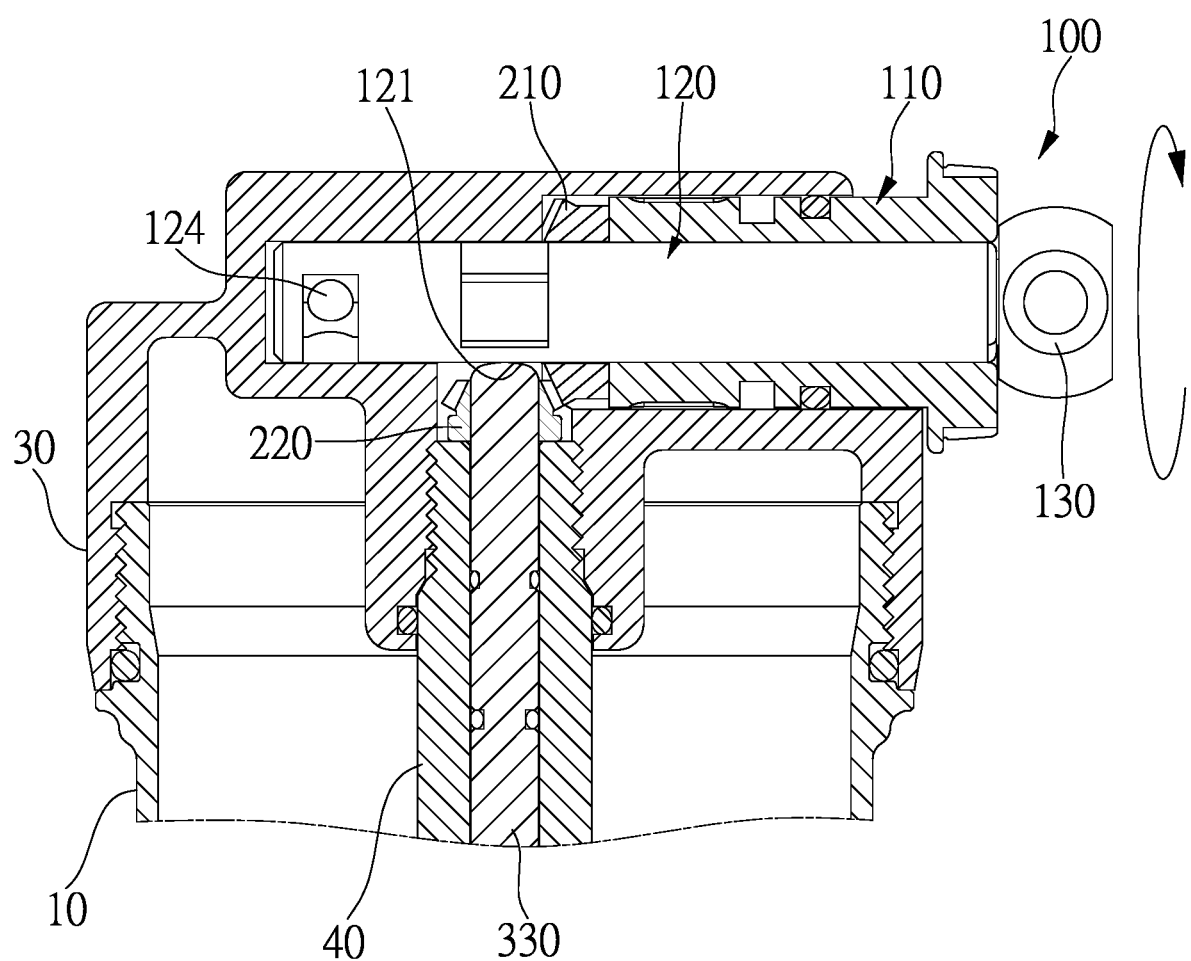
FIG. 11 is an enlarged view of the "C" portion in FIG. 10.
Figure 12:
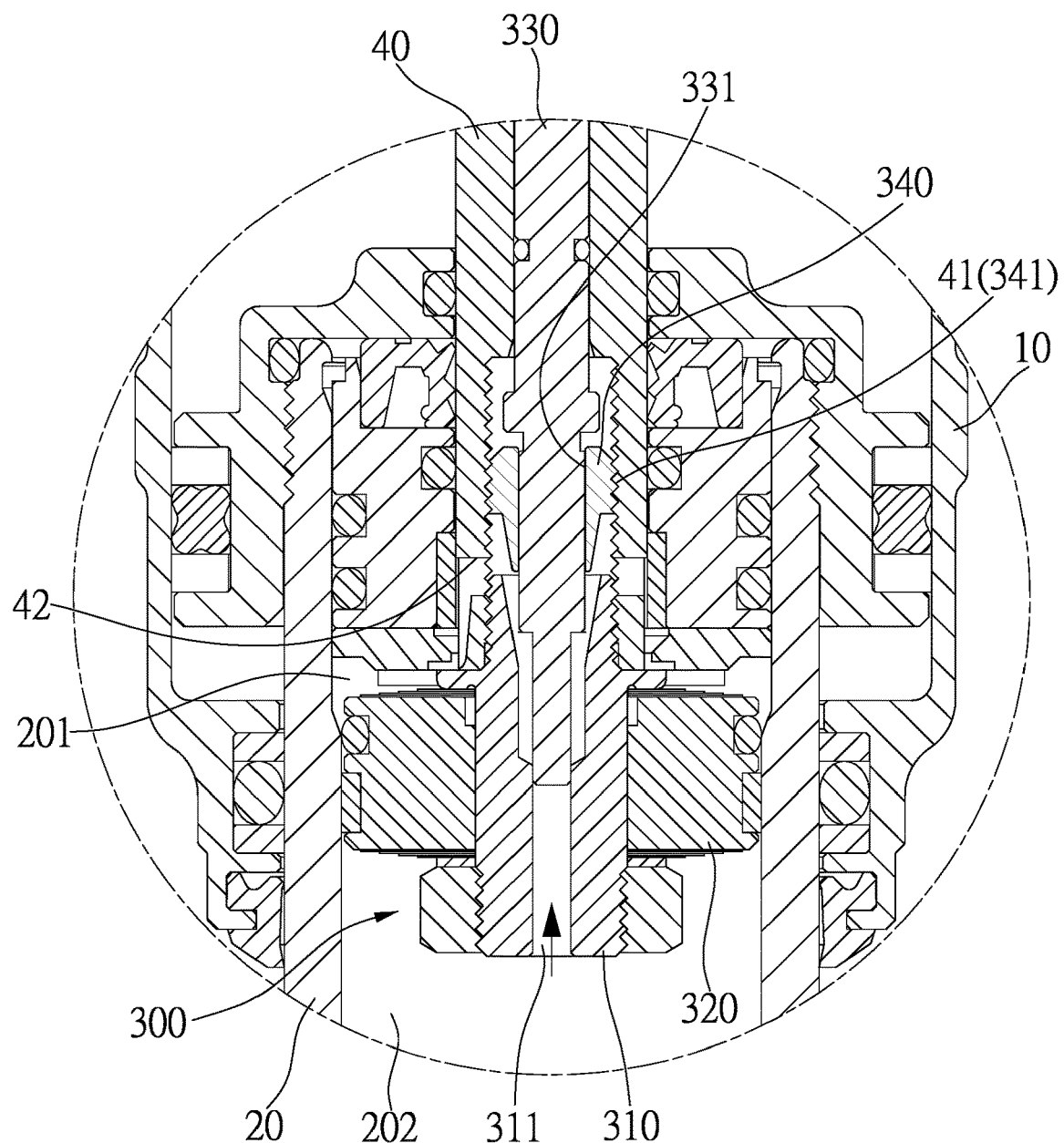
FIG. 12 is an enlarged view of the "D" portion in FIG. 10.
Figure 13:
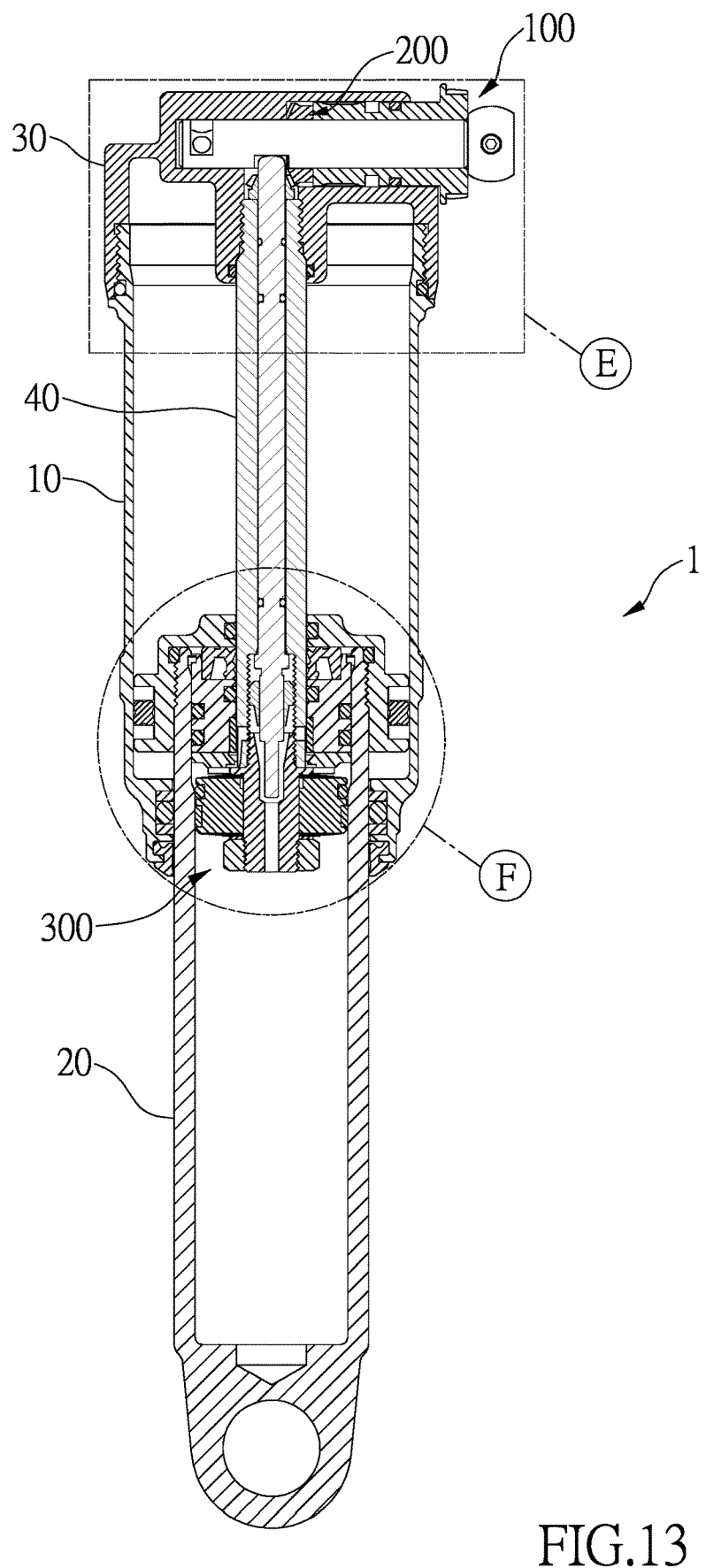
FIG. 13 is another cross sectional view to show the adjustment of the compression damping of the shock absorbing device of the present invention.
Figure 14:
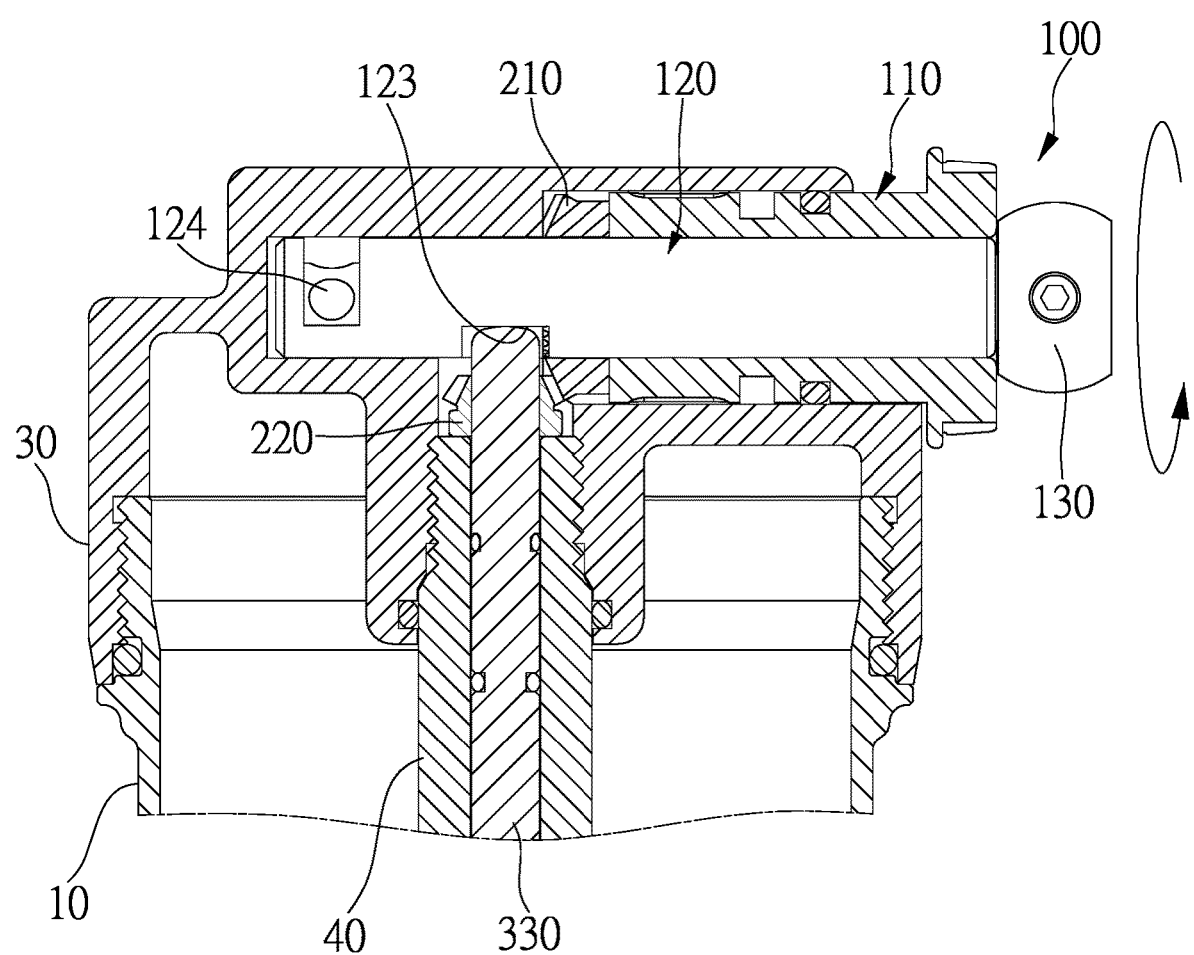
FIG. 14 is an enlarged view of the "E" portion in FIG. 10.
Figure 15:
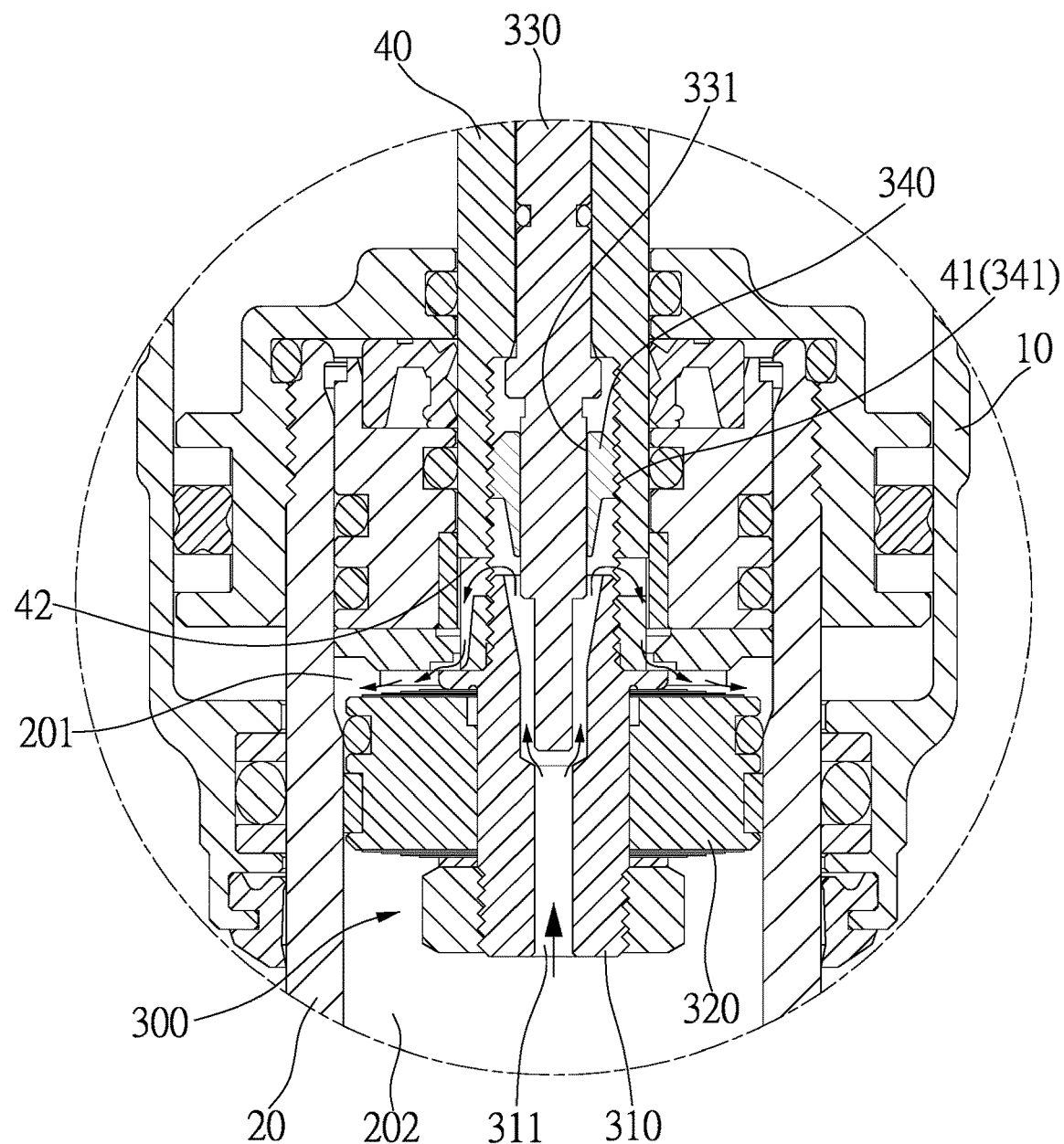
FIG. 15 is an enlarged view of the "F" portion in FIG. 10.
Figure 16:
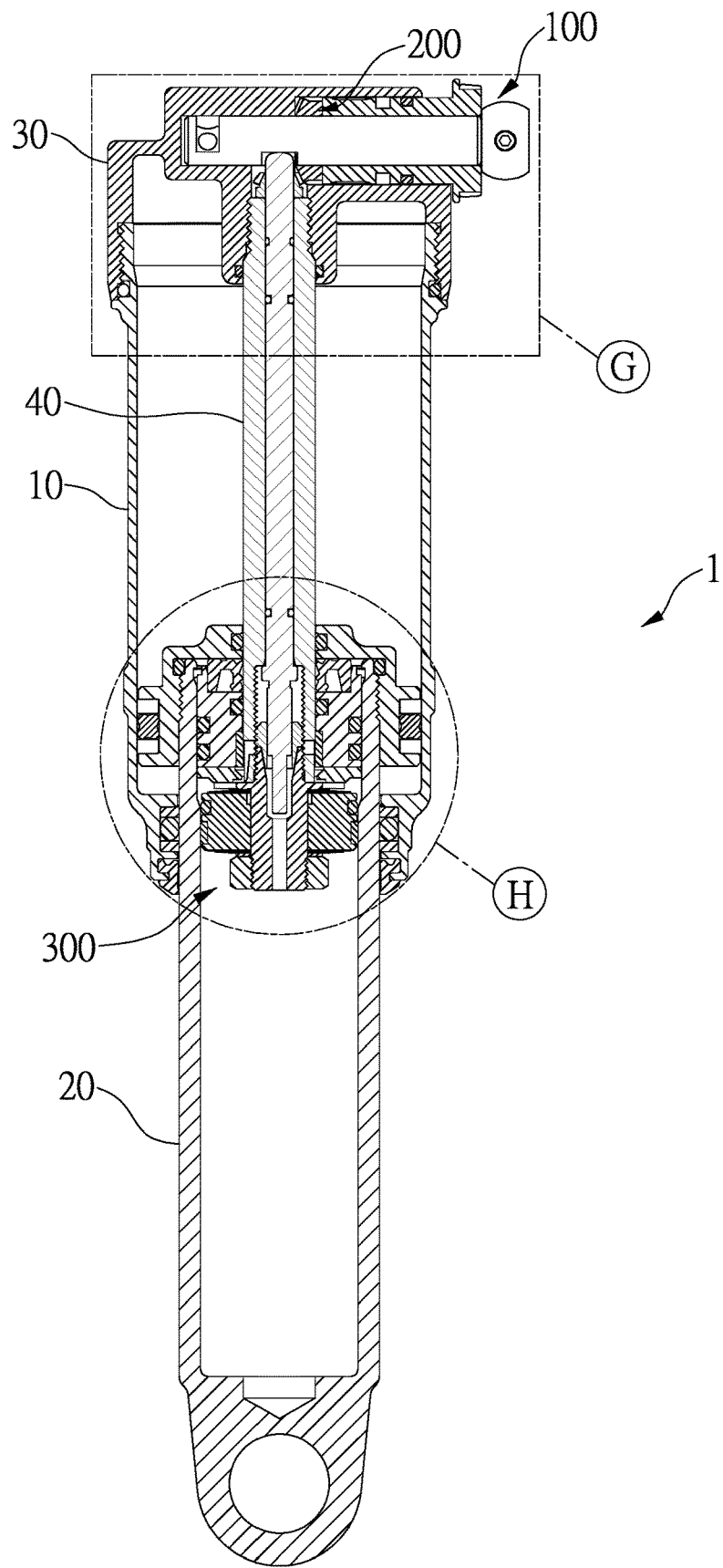
FIG. 16 is a cross sectional view to show the adjustment of the recovery damping of the shock absorbing device of the present invention.
Figure 17:
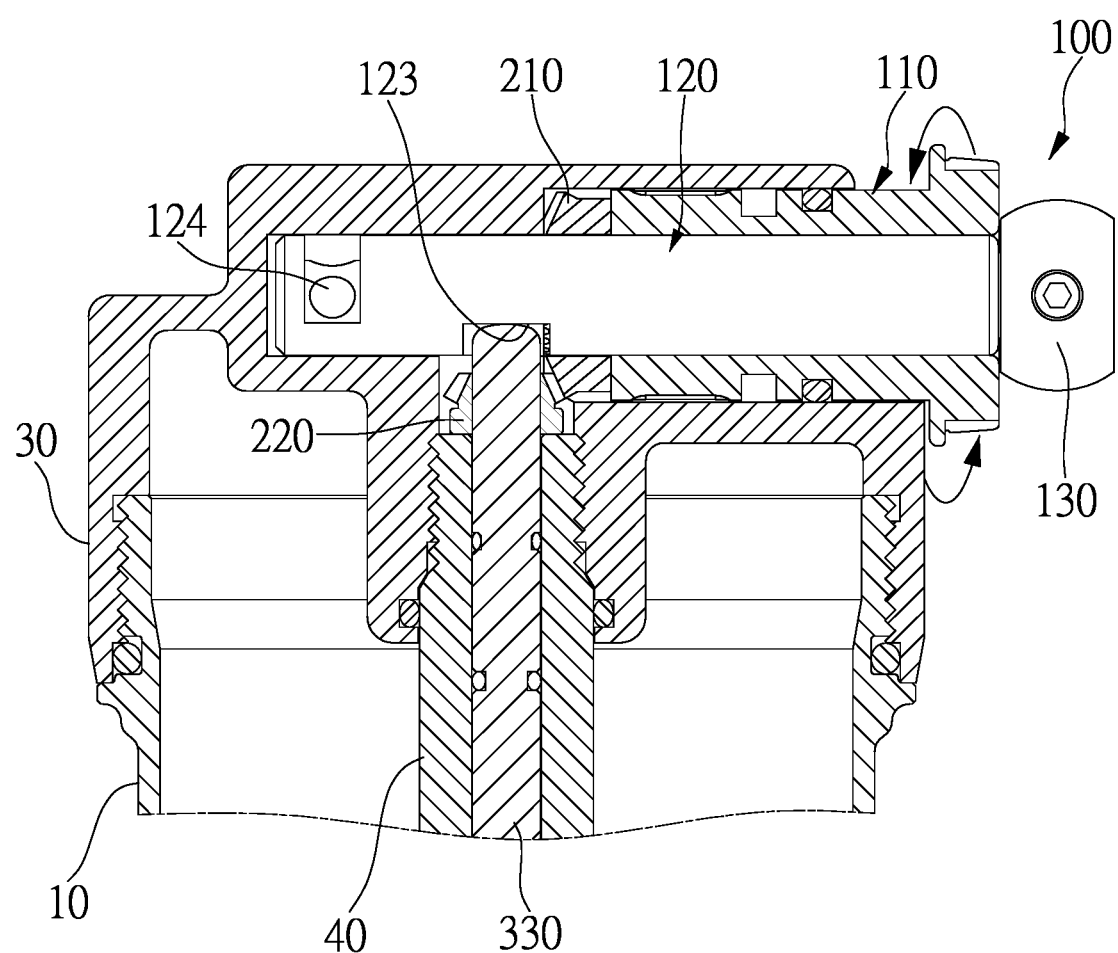
FIG. 17 is an enlarged view of the "G" portion in FIG. 16.
Figure 18:
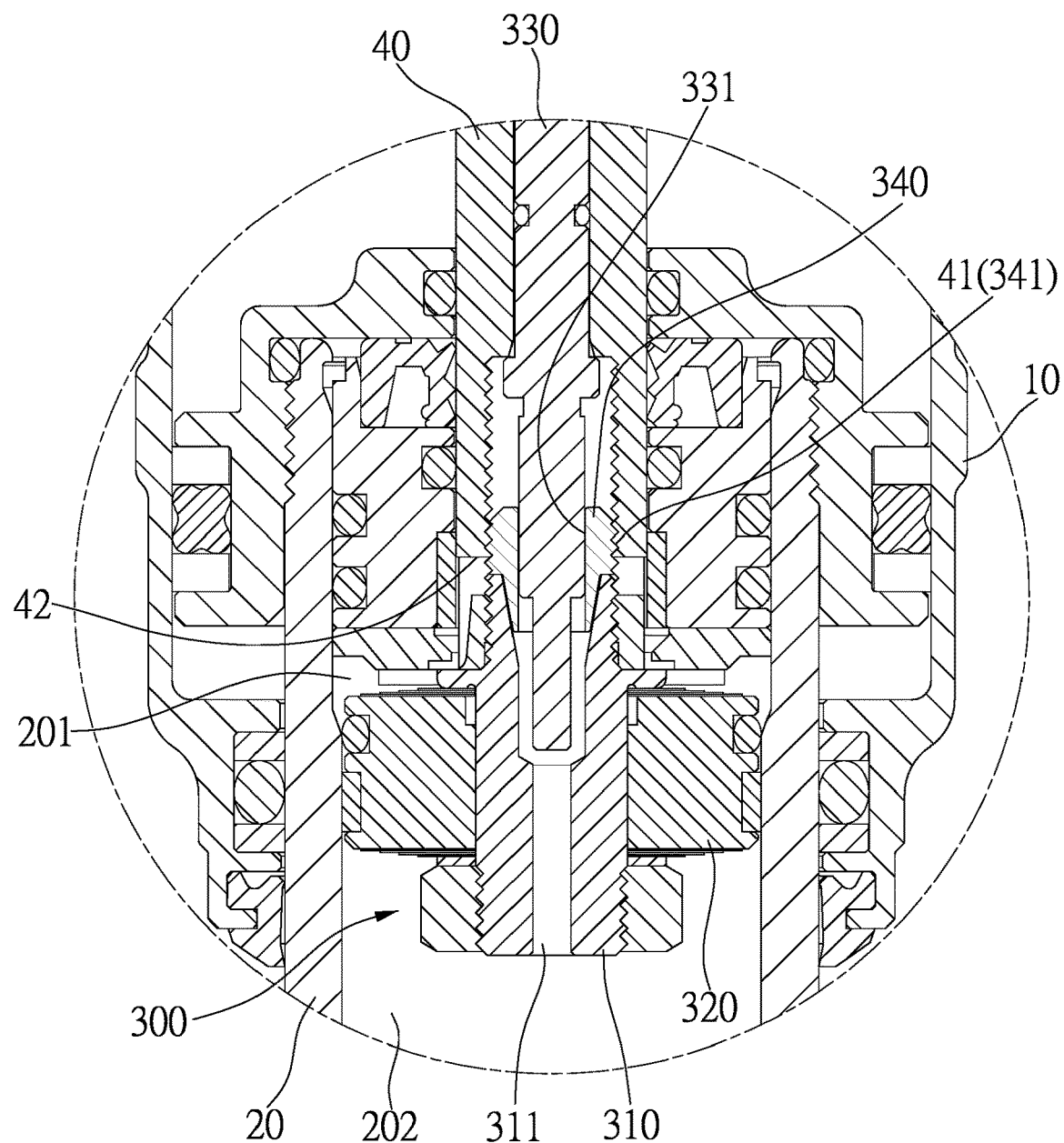
FIG. 18 is an enlarged view of the "H" portion in FIG. 16.
Figure 19:
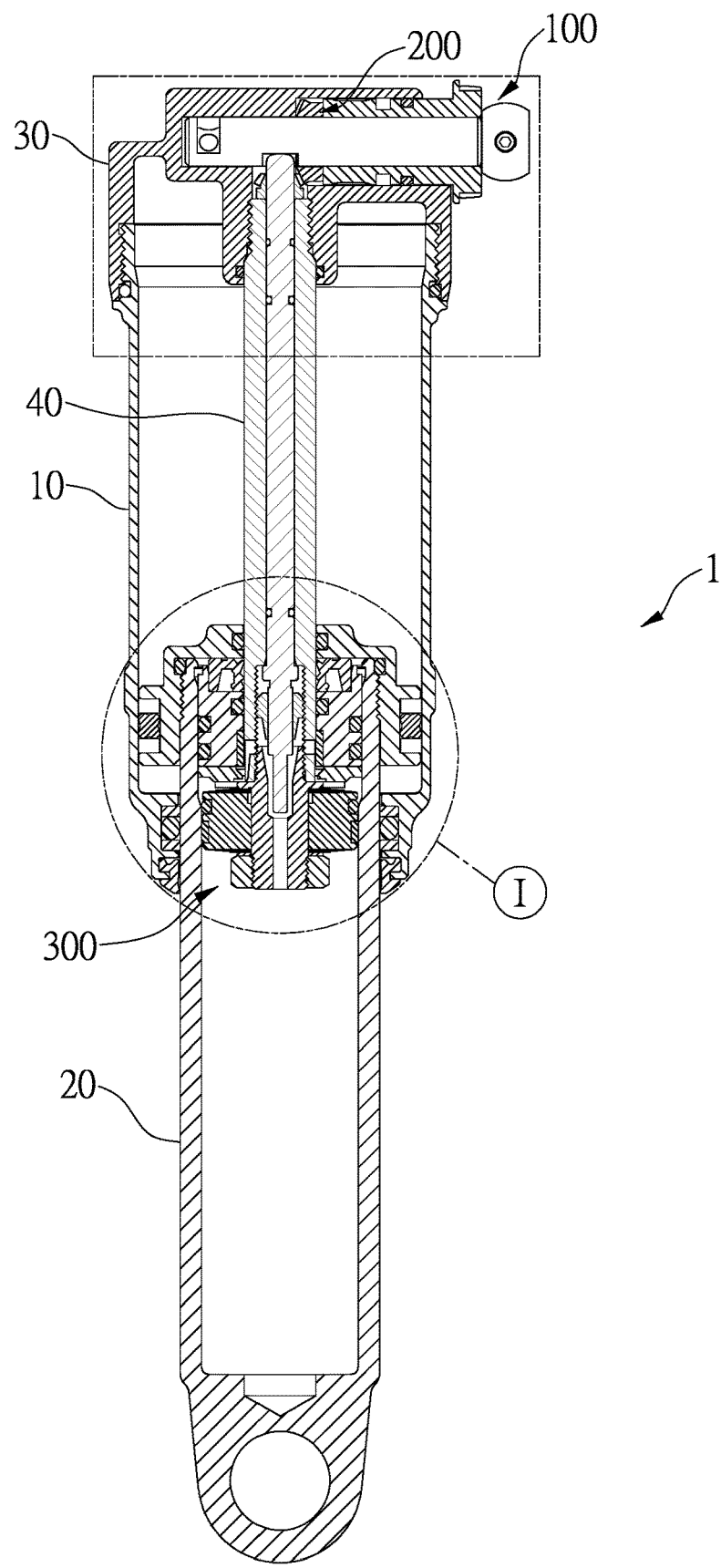
FIG. 19 is another cross sectional view to show the adjustment of the recovery damping of the shock absorbing device of the present invention.
Figure 20:
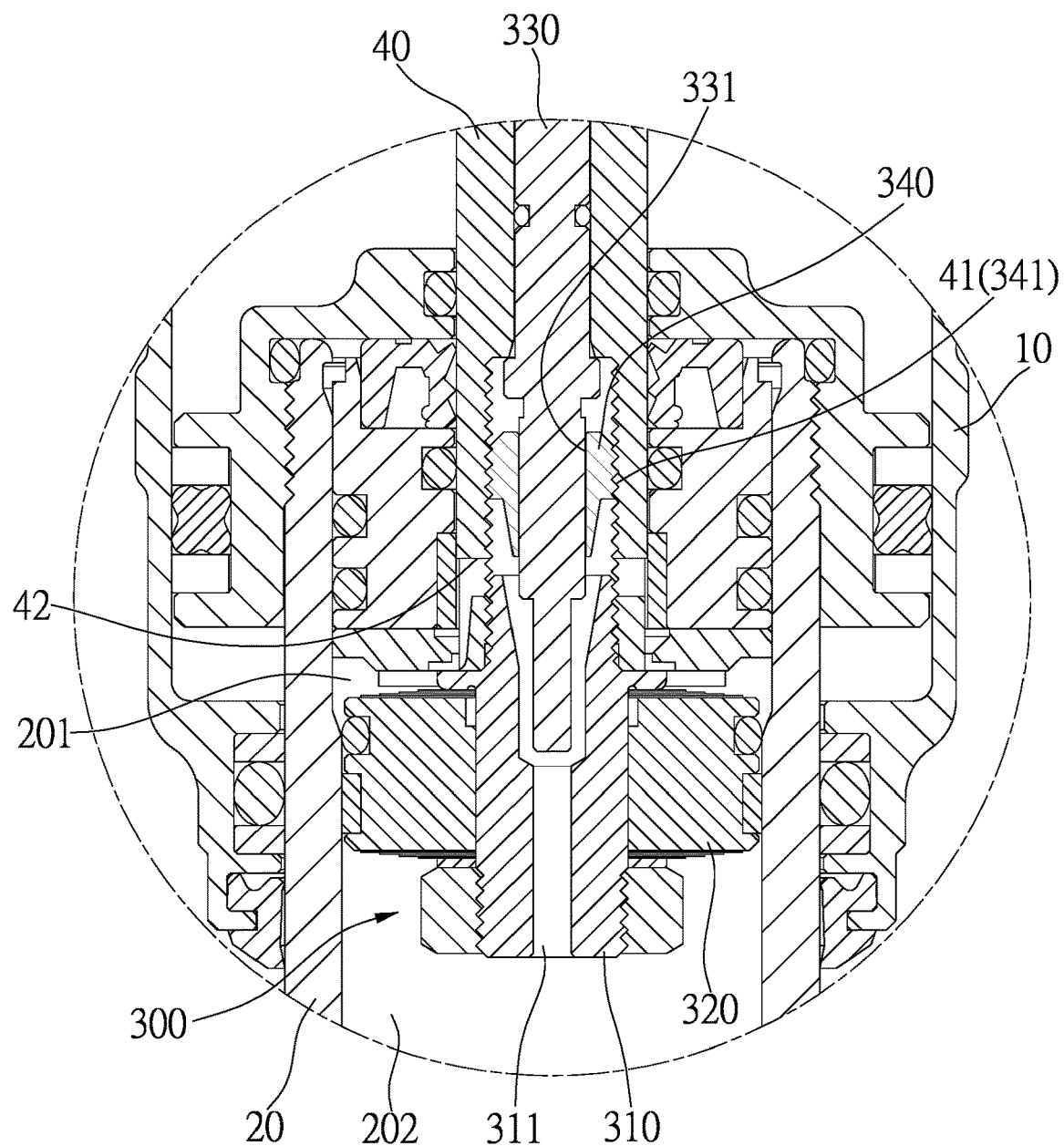
FIG. 20 is an enlarged view of the "I" portion in FIG. 19.

As shown in FIG. 5, the first shaft 110 includes multiple protrusions 111. The first bevel gear 210 includes multiple notches 211. The protrusions 111 are engaged with the notches 211. In this embodiment, there are two protrusions 111 and two notches 211 so as to evenly share the force between the protrusions 111 and the notches 211. This is also convenient for assembling and dis-assembling.

As shown in FIGS. 6 to 15, the second shaft 120 includes a first face 121, a second face 122 and a third face 123 formed in the outer periphery thereof. The second face 122 is located closer to the center "O" of the second shaft 120 when compared with the first face 121. The third face 123 is located closer to the center "O" of the second shaft 120 when compared with the second face 122. The first thee 121 is a curved face, and the second and third faces 122, 123 are straight faces which are perpendicular to each other. When the second shaft 120 is rotated, a damper unit 300 of the shock absorbing device 1 contacts the first face 121, the second face 122 and the third face 123 of the second shaft 120 respectively to switch the compression damping between a locked mode, a quick mode and a slow mode. These three modes provide the uses to adjust the compression damping according to the roads condition to save energy and increase efficiency.

The shock absorbing device 1 further includes a top tube 10, a bottom tube 20, a crown and an inner tube 40. The bottom tube 20 is retractably inserted into the bottom end of the top tube 10. The crown 30 is connected to the top end of the top tube 10. The inner tube 40 is located between the top tube 10 and the bottom tube 20. The top end of the inner tube 40 is connected to the crown 30. The control unit 100 and the transmission unit 200 are located in the crown 30. The two respective first ends of the first and second shafts 110, 120 protrude beyond the crown 30.

Figure 4:
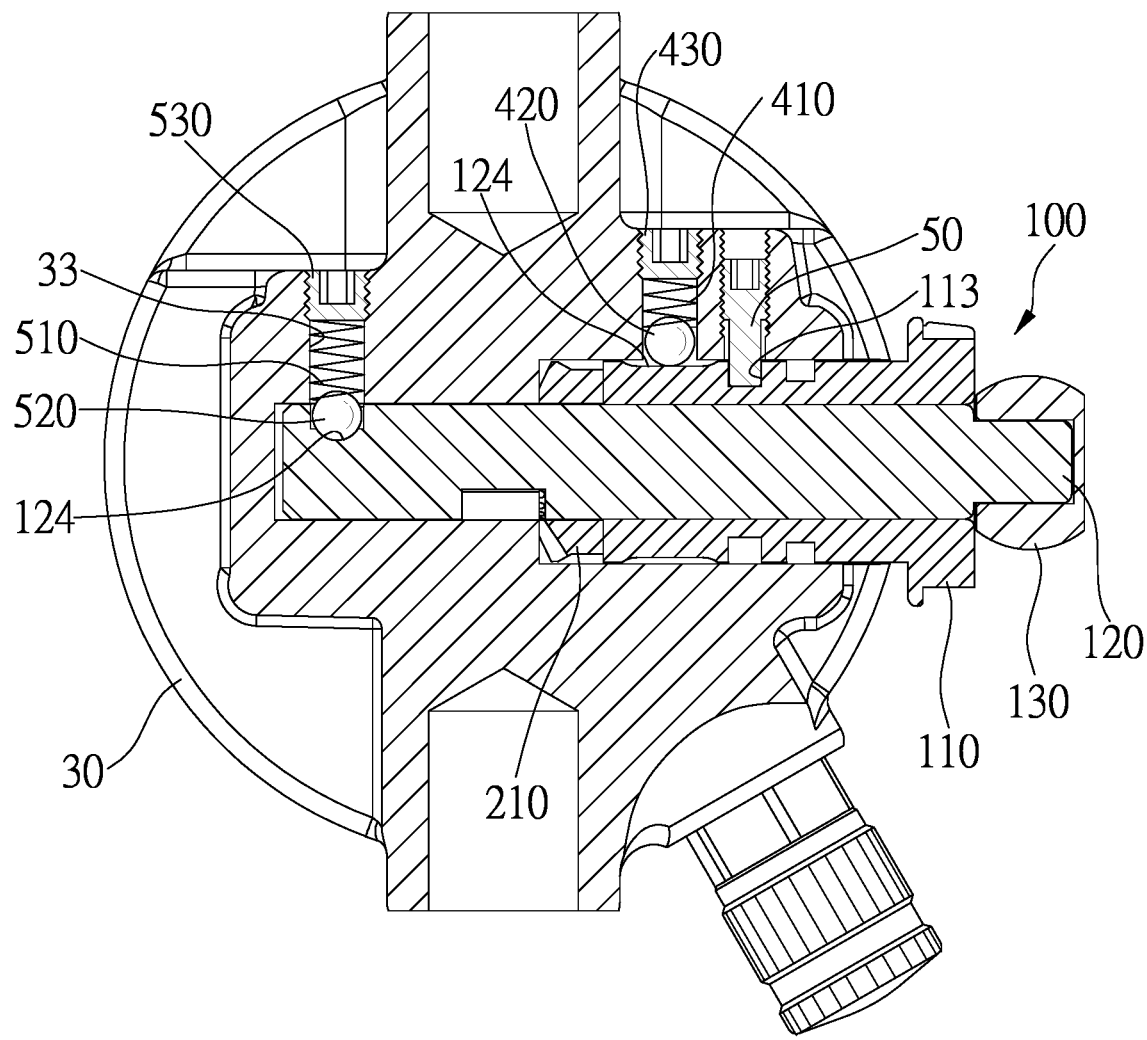
FIG. 4 is a cross sectional view, taken along line IV-IV in FIG. 1.

As shown in FIG. 4, the crown 30 includes a first hole 31 and a second hole 32. A first biasing unit 400 is located in the first hole 31 and includes a first spring 410, a first bead 420 and a first end piece 430. The first spring 410 is biased between the first bead 420 and the first end piece 430 so that the first bead 420 normally engages with one of first axial slots 112 formed in the outer periphery of the first shaft 110. By the first biasing unit 400, when the first shaft 110 adjusts the recovery damping, the first shaft 110 does not rotate during pedaling of the bicycle so as to keep the set recovery damping. A stop member 50 is connected to the second hole 32 of the crown 30. One end of the stop member 50 is restricted in one of first annular slots 113 formed to the outer periphery of the first shaft 110 to restrict the first shaft 110 from dropping outward from the crown 30.

The crown 30 includes a third hole 33. A second biasing unit 500 is located in the third first hole 33 and includes a second spring 510, a second bead 520 and a third end piece 530. The second spring 510 is biased between the second bead 520 and the second end piece 530 so that the second bead 520 normally engages with one of second axial slots 124 formed in the outer periphery of the of the second shaft 120. By the second biasing unit 500, after the second shalt 120 is used to adjust the compression damping, the second biasing unit 500 maintains the position of the second shaft 120. The second shaft 120 does not rotate during pedaling of the bicycle so as to keep the set compression damping. The control unit 100 includes a lever 130 which is mounted to the first end of the second shaft 120 and restricts the first shaft 110 from dropping from the second shaft 120 toward the crown 30.

As shown in FIGS. 16 to 20, the damper unit 300 includes a sleeve 310, a piston 320, an axle 330 and an end member 340. The sleeve 310 extends through the piston 320 and is connected to the bottom end of the inner tube 40. The sleeve 310 is located in the bottom tube 20. The piston 320 divides the inner space of the bottom tube 20 into a top chamber 201 and a bottom chamber 202. The sleeve 310 includes a passage 311 defined axially therethrough which communicates with the top and bottom chamber 201, 202. The top end of the axle 330 extends through the inner tube 40, a first end of the axle 330 extends through the second bevel gear 220 and contacts one of the first, second and third faces 121, 122, 123 of the second shaft 120 so that the axle 330 moves within the inner tube 40 axially. The second end of the axle 330 is located to seal the passage 311, to be away from the passage 311 or to approach the passage 311. The top and bottom chambers 201, 202 is filled with liquid such as oil or gas which flows through the passage 311. By the second end of the axle 330 located to seal the passage 311, away from the passage 311 or approach the passage 311, the fluid is adjusted to not flow into the top chamber 201 via the bottom chamber 202 and the passage 311, to flow into the top chamber 201 via the bottom chamber 202 and the passage 311, or to slowly flow into the top chamber 201 via the bottom chamber 202 and the passage 311, so as to adjust shock absorbing device 1 between the locked, the quick mode and the slow mode. The bottom end of the inner tube 40 includes a threaded hole 41. The inner tube 40 includes a lateral hole 42 that communicates with the threaded hole 41 and the top chamber 201. The axle 330 includes a polygonal section 331 which extends through the end member 340. The end member 340 includes outer threads 341 which are threadedly connected to the threaded hole 41. When the first bevel gear 210 drives the second bevel gear 220, the axle 330 and the second bevel gear 220 are co-rotated so that the axle 330 drives the end member 340 to move relative to the threaded hole 41, so that the end member 340 removes from a position where the lateral hole 42 is covered to another position where the lateral hole 42 is not covered. By the movement of the end member 340 moving from the position that the end member 340 covers the lateral hole 420 to the position that the end member 340 does not cover the lateral hole 420, the portion that the lateral hole 420 is covered by the end member 340 can change the speed of the fluid that flows the passage 311 to the top chamber 201 so as to adjust the recovery damping.

While we have shown and described the embodiment in accordance with the present invention, it should be clear to those skilled in the art that further embodiments may be made without departing from the scope of the present invention.

What is claimed is:

1. A shock absorbing device comprising:
   a control unit having a first shall and a second shalt, the second shaft freely and mtatably extending through the first shaft, a first end of first shaft and a first end of the second shaft protruding beyond the shock absorbing device;
   a transmission unit including a first bevel gear and a second bevel gear, the second shaft freely and rotatably extending through the first bevel gear;
   the first shaft including multiple protrusions, the first bevel gear including multiple notches, the protrusions engaged with the notches, and wherein the first shaft is rotatable to drive the first bevel gear, the first bevel gear drives the second bevel gear to adjust a recovery damping of the shock absorbing device, wherein the second shaft is rotatable to adjust a compression damping of the shock absorbing device.

2. The shock absorbing device as claimed in claim 1, wherein the second shaft includes a first face, a second face and a third face formed in an outer periphery thereof, when the second shaft is rotated, a damper unit of the shock absorbing device contacts the first face, the second face and the third face of the second shaft respectively to switch the compression damping between a locked mode, a quick mode and a slow mode.

3. The shock absorbing device as claimed in claim 2 further including a top tube, a bottom tube, a crown and an inner tube, the bottom tube retractably inserted into a bottom end of the top tube, the crown connected to a top end of the top tube, the inner tube located between the top tube and the bottom tube, a top end of the inner tube connected to the crown, the control unit and the transmission unit located in the crown, the two respective first ends of the first and second shafts protruding beyond the crown.

4. The shock absorbing device shock absorbing device as claimed in claim 3, wherein the crown includes a first hole and a second hole, a first biasing unit is located in the first hole and includes a first spring, a first bead and a first end piece, the first spring is biased between the first bead and the first end piece so that the first bead normally engages with one of first axial slots formed in an outer periphery of the first shaft, a stop member is connected to the second hole of the crown, one end of the stop member is restricted in one of first annular slots formed to the outer periphery of the first shaft to restrict the first shaft from dropping outward from the crown.

5. The shock absorbing device as claimed in claim 3, wherein the crown includes a third hole, a second biasing unit is located in the third first hole and includes a second spring, a second bead and a third end piece, the second spring is biased between the second bead and the second end piece so that the second bead normally engages with one of second axial slots formed in the outer periphery of the of the second shaft, the control unit includes a lever which is mounted to the first end of the second shaft and restricts the first shaft from dropping from the second shaft toward the crown.

6. The shock absorbing device shock absorbing device as claimed in claim 3, wherein the damper unit includes a sleeve, a piston, an axle and an end member, the sleeve extends through the piston and is connected to a bottom end of the inner tube, the sleeve is located in the bottom tube, the piston divides an inner space of the bottom tube into a top chamber and a bottom chamber, the sleeve includes a passage defined axially therethrough which communicates with the top and bottom chamber, the axle extends through the inner tube, a first end of the axle extends through the second bevel gear and contacts one of the first, second and third faces of the second shaft so that the axle ov within the inner tube axially, a second end of the axle is located to seal the passage, to be away from the passage or to approach the passage, the bottom end of the inner tube includes a threaded hole, the inner tube includes a lateral hole that communicates with the threaded hole and the top chamber, the axle includes a polygonal section which extends through the end member, the end member includes outer threads which are threadedly connected to the threaded hole, when the first bevel gear drives the second bevel gear, the axle and the second. bevel gear are co-rotated so that the axle drives the end member to move relative to the threaded hole, so that the end member removes from a position where the lateral hole is covered to another position where the lateral hole is not covered.

\* \* \* \* \*